UNITED STATES PATENT OFFICE.

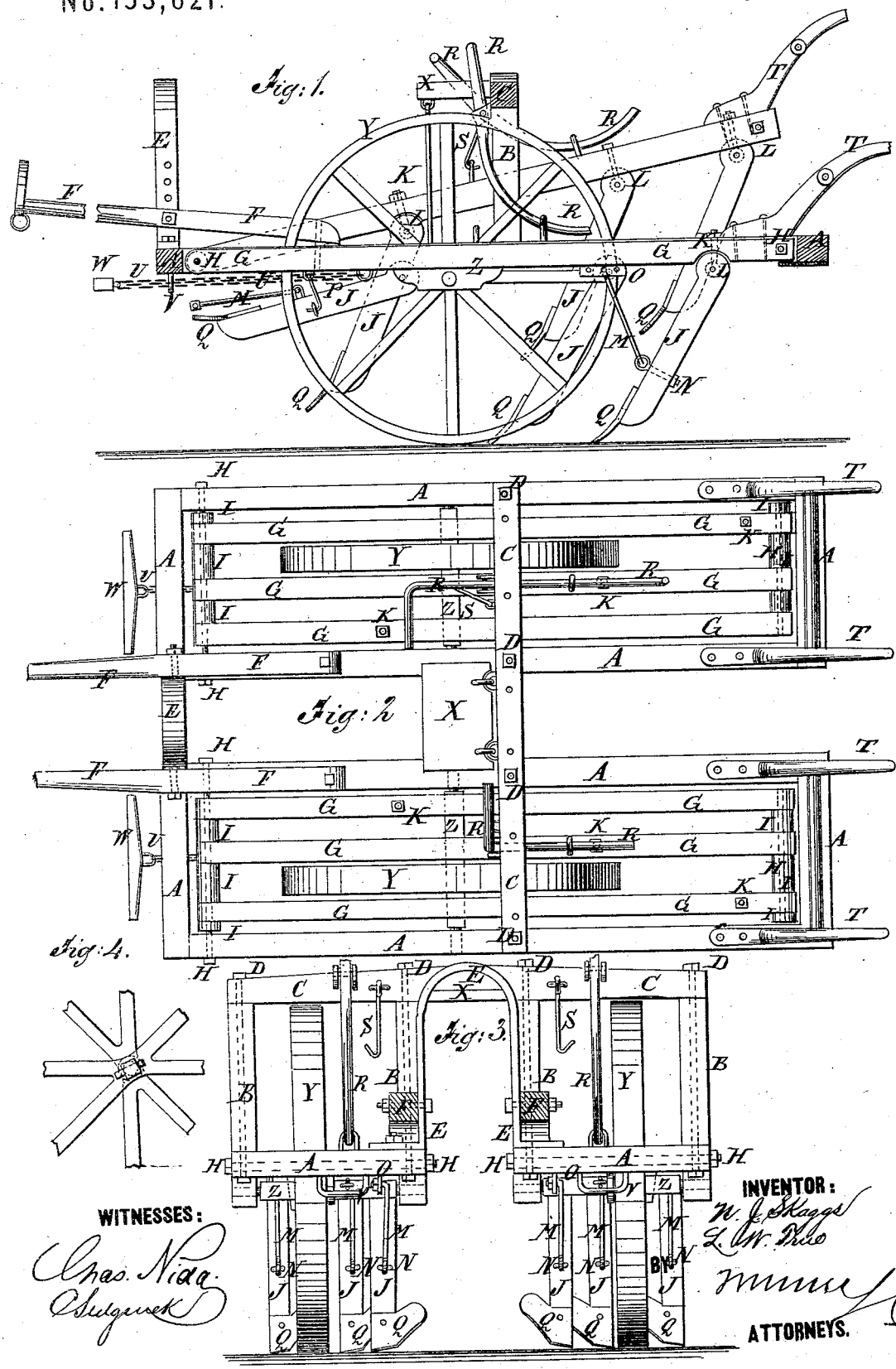

NEWTON J. SKAGGS AND LORENZO W. TRUE, OF TALLADEGA, ALABAMA.

IMPROVEMENT IN COMBINED SULKY-PLOWS AND CULTIVATORS.

Specification forming part of Letters Patent No. 153,621, dated July 28, 1874; application filed May 29, 1874.

*To all whom it may concern:*

Be it known that we, NEWTON J. SKAGGS and L. W. TRUE, of Talladega, in the county of Talladega and State of Alabama, have invented a new and useful Improvement in Combined Sulky-Plows and Cultivators, of which the following is a specification:

Figure 1 is a side view of our machine, the side bar of the outer frame being removed. Fig. 2 is a top view of the same. Fig. 3 is a front view of the same. Fig. 4 is a detail view, showing the construction of the wheels.

Similar letters of reference indicate corresponding parts.

The invention will first be fully described, and then pointed out in the claims.

A are two rectangular frames, formed of two side bars and two end bars, framed to each other at their ends. To the middle part of each of the four side bars of the two frames A are attached the lower ends of posts B. To the upper ends of the four posts B is attached a cross-beam, C. The posts B are secured in placed by long bolts D, which pass longitudinally through them, and through the side bars of the frames A, and through the cross-beam C, and have nuts screwed upon their ends. The forward ends of the frames A are connected by an iron bow, E, the ends of which are bent outward, and are bolted to the inner corners of said ends. In the arms of the bow E are formed several holes to receive the bolts by which the tongues F are secured to said arms. The rear ends of the tongues F are secured, by hinges or other suitable means, to the inner side bars of the frames A. The forward ends of the two parts of the tongues F are designed to be connected by a curved iron bar, to which the breast-strap rings are attached. This construction of the main framework of the machine forms a space through which rows of plants or grain can pass, so that the machine can be drawn over said rows without injuring said plants or grain. G are the plow-beams, three of which are placed in each frame A. The ends of the beams G are connected by bolts H, which pass through them and through blocks I, interposed between them, and between them and the side bars of the frames A, so as to keep the said beams in their proper relative positions. At the forward ends of the beams G the bolts H pass through the frames A, as shown in Figs. 1 and 2, to pivot the forward ends of the said beams G to said frames A, and allow the rear ends of the beams to rise and fall as the unevenness of the ground may require, and to enable the plows to be raised from the ground when required. By replacing the blocks I with larger or smaller ones the beams G will be adjusted at a greater or less distance apart, according as larger or smaller plows are to be used. J are the plow-standards, the upper ends of which are rounded off to fit into semi-cylindrical recesses formed in the lower sides of the beams G, and are slotted to receive the eyes of the eyebolts K, which pass up through the said beams G, and have nuts screwed upon their ends. The standards J are held in place upon the beams G and the eyebolt K by bolts L, that pass transversely through the upper ends of the said standards, and through the eyes of the said eyebolts. The draft-strain upon the standards J is sustained by the rods M, the lower ends of which are secured to the lower part of the said standards by eyebolts N, and the upper ends of which are connected with the plates O, attached to the beams G, by means of hooks or other convenient means formed upon, or attached to, said ends. The plates O have several holes formed in them to receive the ends of the rods M, so that they may be conveniently adjusted to regulate the pitch of the plows as may be desired. To the beams G are attached hooks P, to hook into staples attached to the standards J, to enable some of said standards to be raised and held away from the ground while other standards are in working position.

By this construction, by raising the inner standards, and leaving the outer standards in working position, the machine will be adjusted for marking off the land.

To the lower ends of the standards J are attached plows Q, which may be of any desired form or size, according to the kind of work to be done. To the forward side of the cross-beam C, and directly over the central beams G, are pivoted levers R, the lower parts of which are curved to the rearward, and pass through staples or eyes attached to the rear part of said center-beams, so that by operating one or both of the said levers R, the rear ends of one or both sets of beams G may be raised, raising the plows from the ground, for passing obstructions, turning, &c. The beams G may be held suspended, for convenience in passing from place to place, by hooks S, attached to the cross-beam C, and which hook into staples or eyes attached to the said beams. T are handles attached to the rear ends of the beams G. U are the draft-chains, the rear ends of which are connected with the central beams a little in front of their middle parts. The chains U pass through guide staples or loops V, attached to the front cross-bars of the frames A, and to their forward ends are attached the whiffletrees W.

By this construction the plows will be held into the ground by the draft. X is the driver's seat, which is connected with, and supported from, the cross-beam C and the inner side bars of the frames A.

When the machine is to be used as a breaking-up plow the inner side bars of the frames A are placed together, and the parts of the tongue F are placed upon, and bolted to, the inner sides of the arms of the bow E. To enable this adjustment to be made, a second set of bolt-holes are formed in the cross-beams C, and in the front cross-bar of the frames A, to receive the bolts by which said cross-beam and bow are secured in place.

With this construction, the two sets of beams may be detached from the frame-work of the machine, and used as single-horse cultivators, if desired.

Y are the sulky-wheels, each of which is attached to a short axle, Z, the journals of which revolve in bearings attached to the side bars of the frames A. The hub and spokes of the wheels Y are formed of two bars, which cross each other at right angles at their centers, and have a square hole formed through them, to receive and fit upon the square axle Z, where they are secured in place by a wedge-key, which forces them against a collar formed upon, or attached to, the axles Z. The arms of the said bars are forked, and to their ends, which are spread apart, so as to be equally distant from each other, is attached the rim of the wheel.

Having thus described our invention, what we claim as new, and desire to secure by Letters Patent, is—

1. The combination, with axle-frames A, of frames G, hinged at one end thereto, and extending, as well as receiving, plows on both sides of the axle, as shown and described.

2. The combination, with plow-frames G, hinged within axle-frame A, of draft-chains attached to a staple on and under the said plow-frames, as and for the purpose specified.

NEWTON J. SKAGGS.
LORENZO W. TRUE.

Witnesses:
T. S. PLOWMAN,
J. MORGAN SMITH.